US012606035B2

(12) United States Patent
Foote et al.

(10) Patent No.: US 12,606,035 B2
(45) Date of Patent: Apr. 21, 2026

(54) DEVICES, SYSTEMS, AND METHODS FOR WIRELESS VEHICLE CHARGING

(71) Applicants: VOLKSWAGEN AKTIENGESELLSCHAFT, Wolfsburg (DE); UNIVERSITY OF TENNESSEE RESEARCH FOUNDATION, Knoxville, TN (US)

(72) Inventors: Andrew P. Foote, Knoxville, TN (US); Daniel Costinett, Knoxville, TN (US)

(73) Assignees: VOLKSWAGEN AKTIENGESELLSCHAFT (DE); UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 752 days.

(21) Appl. No.: 18/076,052

(22) Filed: Dec. 6, 2022

(65) Prior Publication Data

US 2024/0181901 A1 Jun. 6, 2024

(51) Int. Cl.
*B60L 53/122* (2019.01)
*H02J 50/10* (2016.01)

(52) U.S. Cl.
CPC ............ *B60L 53/122* (2019.02); *H02J 50/10* (2016.02)

(58) Field of Classification Search
CPC ........ B60L 53/122; B60L 53/12; H02J 50/10; H02J 50/12; H02J 50/70
USPC .................................. 320/108, 109; 307/104
See application file for complete search history.

(56) References Cited

U.S. PATENT DOCUMENTS

| | | | | |
|---|---|---|---|---|
| 8,422,973 | B2 * | 4/2013 | Takarada | ........... G06K 7/10336 |
| | | | | 343/866 |
| 9,318,258 | B2 * | 4/2016 | Yamakawa | ............... H01Q 7/00 |
| 9,517,697 | B2 * | 12/2016 | Woronowicz | ......... H02J 50/402 |
| 9,899,145 | B2 * | 2/2018 | Covic | ................. H01F 27/2823 |
| 9,912,172 | B2 * | 3/2018 | Samuelsson | .......... H02J 50/005 |
| 10,029,576 | B2 * | 7/2018 | Yuasa | ..................... H02J 50/70 |
| 10,083,792 | B2 | 9/2018 | Werner et al. | |
| 10,110,070 | B2 * | 10/2018 | Yao | ......................... H02J 50/12 |
| 10,144,302 | B2 * | 12/2018 | Samuelsson | .......... H02J 50/005 |
| 10,411,492 | B2 * | 9/2019 | Yao | ......................... H02J 50/12 |
| 10,461,582 | B2 * | 10/2019 | White | ..................... H01F 38/18 |
| 10,483,772 | B2 | 11/2019 | Cong et al. | |
| 10,748,699 | B2 * | 8/2020 | Tokura | .................. H01F 27/306 |

(Continued)

FOREIGN PATENT DOCUMENTS

| | | | | | |
|---|---|---|---|---|---|
| CN | 109462292 | A | * | 3/2019 | ............. H02J 50/70 |
| GB | 2496187 | A | * | 5/2013 | ........... H02J 50/005 |
| WO | WO-2022018439 | A1 | * | 1/2020 | ............. H02J 50/10 |

OTHER PUBLICATIONS

Scher et al.; Design and optimization of cancellation coil topologies for a ferrite-less wireless EV charging pad; 2021 IEEE Transportation Electrification Conference & Expo (ITEC); Jun. 21-25, 2021; pp. 1-7; Chicago, Illinois.

*Primary Examiner* — Jared Fureman
(74) *Attorney, Agent, or Firm* — BARNES & THORNBURG LLP

(57) ABSTRACT

Devices, systems, and methods related to wireless charging for transportation vehicles include a wireless charge assembly including a capacitor bank assembly, shielding body, and a coil assembly. The coil assembly can include a coil body having a plurality of shielding turns positioned which can be arranged to reduce stray field from inductive charging of the transportation vehicle.

18 Claims, 4 Drawing Sheets

(56)                References Cited

U.S. PATENT DOCUMENTS

| | | | | |
|---|---|---|---|---|
| 10,790,083 | B2 * | 9/2020 | Han | H02J 50/70 |
| 10,840,014 | B2 * | 11/2020 | Suzuki | H02J 50/70 |
| 10,886,790 | B2 * | 1/2021 | Ryu | H02J 50/12 |
| 11,342,800 | B2 * | 5/2022 | Oro | H02J 50/90 |
| 11,498,439 | B2 * | 11/2022 | Laemmle | B60L 53/12 |
| 11,521,792 | B2 * | 12/2022 | Varghese | B60L 53/122 |
| 11,876,384 | B2 * | 1/2024 | Guo | H01F 27/363 |
| 12,132,331 | B2 * | 10/2024 | Kim | H02J 50/402 |
| 12,149,096 | B2 * | 11/2024 | Zhang | H01F 27/289 |
| 12,255,468 | B2 * | 3/2025 | Zhang | H02J 50/005 |
| 12,316,139 | B2 * | 5/2025 | Aldhaher | H02J 50/70 |
| 2012/0306262 | A1 * | 12/2012 | Taguchi | H02J 50/12 |
| | | | | 307/104 |
| 2013/0270921 | A1 * | 10/2013 | Boys | H02J 50/10 |
| | | | | 307/104 |
| 2015/0091519 | A1 * | 4/2015 | Komma | H01F 27/363 |
| | | | | 320/108 |
| 2015/0255205 | A1 * | 9/2015 | Islinger | B60L 53/122 |
| | | | | 336/92 |
| 2015/0332827 | A1 * | 11/2015 | Omori | H01F 27/38 |
| | | | | 307/104 |
| 2016/0013661 | A1 * | 1/2016 | Kurs | H02J 7/00034 |
| | | | | 307/104 |
| 2016/0284465 | A1 * | 9/2016 | Maniktala | H02J 50/12 |
| 2016/0355094 | A1 * | 12/2016 | Yamakawa | H02J 7/0042 |
| 2017/0187209 | A1 * | 6/2017 | Yao | H02J 50/12 |
| 2018/0090971 | A1 * | 3/2018 | Graham | H02J 50/402 |
| 2018/0219423 | A1 * | 8/2018 | Maunder | G06K 19/0723 |
| 2019/0392984 | A1 * | 12/2019 | Han | H01F 38/14 |
| 2021/0082617 | A1 * | 3/2021 | Varghese | H02J 50/005 |
| 2023/0198303 | A1 * | 6/2023 | Yu | H02J 50/12 |
| | | | | 307/104 |
| 2023/0198310 | A1 * | 6/2023 | Aldhaher | H02M 7/06 |
| | | | | 307/104 |
| 2023/0275466 | A1 * | 8/2023 | Ahn | H02J 50/005 |
| | | | | 307/104 |
| 2023/0369916 | A1 * | 11/2023 | Kim | H02J 50/402 |

* cited by examiner

DEVICES, SYSTEMS, AND METHODS FOR WIRELESS VEHICLE CHARGING

FIELD

The present disclosure relates to devices, systems, and methodologies for vehicle charging. More particularly, the present disclosure relates to devices, systems, and methodologies for wireless vehicle charging.

BACKGROUND

Transportation vehicles, such as cars, trucks, and buses, are increasing applying electric power for motive energy. In implementing electric vehicles, or EVs, having on-board electric power sources, such as chemical batteries, recharging of the battery can be challenging. For example, speed and/or ease of recharging can be particularly challenging when compared to the speed and/or ease of refuelling traditional combustion engine transportation vehicles. In applying wireless charging to recharge batteries with little or no contact, additional challenges can exist.

SUMMARY

According to an aspect within the present disclosure, a transportation vehicle for wireless charging includes a transportation vehicle chassis having a lower section; a charge assembly mounted with the lower section and configured to receive wireless charge from a ground charge assembly. The charge assembly may include a shielding body, a capacitor bank assembly arranged on one side of the shielding body, and a charge coil assembly arranged on an opposite side of the shielding body.

The charge coil assembly may include a coil body including a number of coils each having coil turns arranged in a charging plane. The coil body may include a plurality of shielding turns positioned along the charging plane adjacent the number of coil turns. The shielding turns may be arranged on opposing ends of the coil body within the charging plane.

In some embodiments, each shielding turn may be arranged to circulate current in a shielding direction defined opposite to a charging direction in which current circulates via corresponding adjacent coil turns. One shielding turn may be arranged to circulate current in its shielding direction defined as either one of clockwise or counterclockwise, and the corresponding adjacent coil turns may be arranged to circulate current in their charging direction defined as the other of clockwise and counterclockwise. In some embodiments, another shielding turn may be arranged to circulate current in its shielding direction defined as the other of clockwise or counterclockwise, and the other corresponding adjacent coil turns may be arranged to circulate current in its charging direction defined as the one of clockwise and counterclockwise.

In some embodiments, the charge coil assembly may be formed as a continuous length of conductor. Opposite ends of the continuous length of conductor may penetrate through the shielding body at the same location to reduce additional flux. The location of penetration through the shielding body may correspond with a center of one of the coils.

In some embodiments, the number of coils may include at least two coils arranged side by side, and the continuous length of conductor may cross the coils turns of each of the at least two coils on the adjacent sides.

In some embodiments, the charging plane may parallel with the ground. In some embodiments, the number of coils of the coil body may be greater than one, each shielding turn may correspond to one of the number of coils. In some embodiments, each shielding turn may include fewer turns than the number of coil turns of the corresponding one of the number of coils. In some embodiments, the charge coil assembly may be configured to reduce stray field in a bipolar single-phase arrangement for inductive wireless charging.

According to another aspect of the present disclosure, a vehicle wireless charge assembly may include a shielding body; a capacitor bank assembly arranged on one side of the shielding body; and a charge coil assembly arranged on an opposite side of the shielding body.

The charge coil assembly may include a coil body including a number of coils each having coil turns arranged in a charging plane. The coil body may include a plurality of shielding turns positioned along the charging plane adjacent the number of coil turns. The shielding turns may be arranged on opposing ends of the coil body within the charging plane.

In some embodiments, each shielding turn may be arranged to circulate current in a shielding direction defined opposite to a charging direction in which current circulates via corresponding adjacent coil turns. One shielding turn may be arranged to circulate current in its shielding direction defined as either one of clockwise or counterclockwise, and the corresponding adjacent coil turns may be arranged to circulate current in their charging direction defined as the other of clockwise and counterclockwise. In some embodiments, another shielding turn may be arranged to circulate current in its shielding direction defined as the other of clockwise or counterclockwise, and the other corresponding adjacent coil turns may be arranged to circulate current in its charging direction defined as the one of clockwise and counterclockwise.

In some embodiments, each shielding turn may be formed of a continuous length of conductor integral with the corresponding adjacent coil turns. Opposite ends of the continuous length of conductor may penetrate through the shielding body at the same location to reduce additional flux. The location of penetration through the shielding body may correspond with a center of one of the coils.

In some embodiments, the number of coils may include at least two coils arranged side by side. The continuous length of conductor may cross the coils turns of each of the at least two coils on the adjacent sides. In some embodiments, the number of coils of the coil body may be greater than one.

In some embodiments, each shielding turn may correspond to one of the number of coils. In some embodiments, each shielding turn may include fewer turns than the number of coil turns of the corresponding one of the number of coils. In some embodiments, the charge coil assembly may be configured to reduce stray field under in a bipolar single-phase arrangement for vehicle wireless charging.

In some embodiments, the charge coil assembly may be formed as a continuous length of conductor. In some embodiments, each shielding turn may be defined by a crossover of the continuous length of conductor arranging the shielding turn to conduct current opposite to the corresponding adjacent coil turns.

According to another aspect of the present disclosure, a transportation vehicle system capable of wireless power transfer may include a transportation vehicle chassis having a lower section; a charge assembly mounted with the lower section and configured for wireless power transfer; and a ground charge assembly configured for wireless power transfer, at least one of the charge assembly and the ground charge assembly comprising a shielding body, a capacitor bank assembly arranged on one side of the shielding body, and a charge coil assembly arranged on an opposite side of the shielding body, the charge coil assembly comprising a coil body including a number of coils each having coil turns arranged in a charging plane, wherein the coil body includes a plurality of shielding turns positioned along the charging plane adjacent the number of coil turns, wherein the shielding turns are arranged on opposing ends of the coil body within the charging plane.

According to another aspect of the present disclosure, a wireless power transfer assembly may include a shielding body; a capacitor bank assembly arranged on one side of the shielding body; and a coil assembly arranged on an opposite side of the shielding body, the coil assembly comprising a coil body including a number of coils each having coil turns arranged in a single plane, wherein the coil body includes a plurality of shielding turns positioned along the plane adjacent the number of coil turns, wherein the shielding turns are arranged on opposing ends of the coil body within the plane.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DISCLOSED EMBODIMENTS

Electric-powered transportation vehicles (EVs) which use electricity for motive power often include on-board power storage. Whether combined with other power sources, such as combustion engines or fuel-cells, or implemented alone, on-board chemical battery storage can provide reliable electric power to drive the transportation vehicle. Charging such batteries can face practical challenges.

Wireless charging, for example, through inductive coupling, can reduce practical physical challenges in charging of transportation vehicles, whether in traditional long-term stationary charging or opportunistic charging, for example, at stop signs during travel. Nevertheless, wireless inductive charging can face challenges, such as interrelated challenges of time for charging and amount of coupling. Additionally, electric powered transportation vehicles benefit from relatively high power and high voltage charging to enhance (e.g., shorten) the charge process, which can affect the surrounding environment.

Various organizations provide recommended guidance and standards for the application of wireless charging. For example, the Society of Automotive Engineering under SAE J2954 recommend the practice of wireless charging with a 27 µTrms field limit outside the vehicle extents and within the vehicle in the nominal fundamental frequency range of 79 kHz-90 KHz. Such area is shown by example with respect to FIG. 1, which indicates the area Z where higher energy fields are permissible in wireless power transfer.

Figures 1, 2:
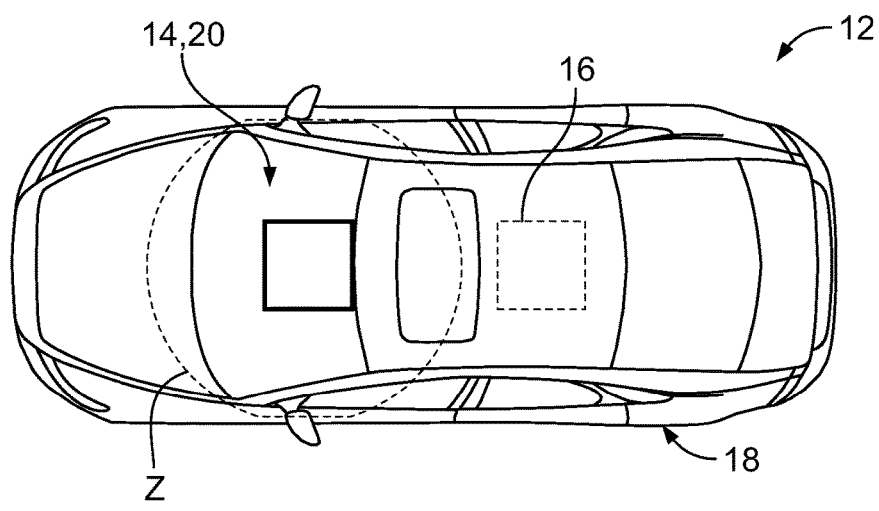
FIG. 1 is an overhead plan view of a vehicle indicating a zone Z within which high frequency wireless power transfer can take place to wirelessly charge the battery of the vehicle.
FIG. 2 is a front elevation view indicating that the vehicle is positioned to arrange a wireless charge assembly in close proximity with a ground charging assembly to conduct wireless power transfer, and showing a diagrammatic zoom of inductive coupling between the wireless charging assembly and the ground charge assembly.

As suggested in FIGS. 1 and 2, a transportation vehicle 12 is shown including a wireless charge assembly 14 for receiving wireless power transfer for charging of the vehicle battery 16. The vehicle 12 includes a chassis 18 including frame and body, supported on wheels engaged with the ground surface. The wireless charge assembly 14 is illustratively mounted with a lower section of the vehicle chassis, and configured to receive wireless power transfer from a ground charge assembly upon positioning in close proximity therewith. In the exemplary FIG. 2, the ground charging assembly 20 is arranged at or on the surface of the ground such that the transportation vehicle 12 can be positioned (driven) over the assembly 20 to closely position the charge assembly 14 and ground assembly 20 for coupling for wireless charging of the transportation vehicle.

Close arrangement of the wireless charge assembly 14 and ground charging assembly 20 can permit wireless power transfer to the transportation vehicle 12 for charging the vehicle battery 16. In the illustrative example as shown in FIG. 2, the wireless charge assembly 14 includes a number of coils, namely, Wireless Power Transfer (WPT) coils for arrangement in close proximity to a number WPT coils of the ground charging assembly 20, which when arranged in sufficient proximity permit inductive coupling for wireless transfer of power from the ground charging assembly 20 to the wireless charge assembly 14 via mutual inductance.

Wireless power transfer between the ground charging assembly 20 and the wireless charge assembly 14 can incur stray electro-magnetic (EM) fields. Such EM fields can refer to either or both of electric and magnetic fields. Such EM fields can present challenges in a variety of forms, including general exposure limits as mentioned above, and/or efficiency challenges in wireless power transfer.

Additionally, the particular construction of the assemblies 14, 20 can dictate the shape or pathway of the EM fields, and thus, can incur directional EM fields which extend beyond areas desired, for example, to project towards the front bumper or sides of the transportation vehicle. Such fields can impact other transportation vehicle equipment and/or can even induce further fields through inductive transfer via other components of the transportation vehicle, for example, by inducing incidental current in structural chassis components otherwise unintended for power transfer.

Accordingly, management of stray fields in wireless power transfer can be challenging. Within the present disclosure, devices, systems, and methods include arrangements of the wireless charge assembly of the transportation vehicle can assist in managing EM fields.

The wireless charge assembly 14 illustratively includes an AC/DC rectifier 22 coupled with its WPT coils to convert transferred AC power into DC power for charging battery 16. The illustrative wireless charge assembly 14 includes a charger secondary circuit including a DC-link and DC/DC converter embodied as a filter for providing suitable (consistent) voltage to the battery 16 for charging. In some embodiments, the wireless charge assembly 14 may include any suitable manner of charger secondary circuit, including no charger secondary circuit as applicable, to adapt the rectifier output to the battery 16 for charging.

The ground charging assembly 20 illustratively includes a high frequency DC/AC inverter 24 coupled with its WPT to convert supplied DC power to AC power for inductive wireless power transfer to the wireless charge assembly 14. The illustrative ground charging assembly 20 includes a charger primary circuit including a DC-link and AC/DC rectifier for receiving and converting supplied AC power into suitable DC power for inverting to suitable AC power for wireless power transfer.

In the illustrative embodiment, supplied AC power is embodied as grid/infrastructure 3-phase power, but in some embodiments may be any suitable form of supplied power. In some embodiments, the ground charging assembly 20 may include any suitable manner of charger primary circuits, including no charger primary circuit as applicable, to provide communication of appropriate AC input to its WPT coils for wireless power transfer to the wireless charge assembly 14. Although the present disclosure discusses wireless power transfer and related arrangements in terms of power transfer and charging of a transportation vehicle, in some embodiments, wireless power transfer from the vehicle to a ground assembly or other receiving assembly may be enabled.

Figures 3, 4:
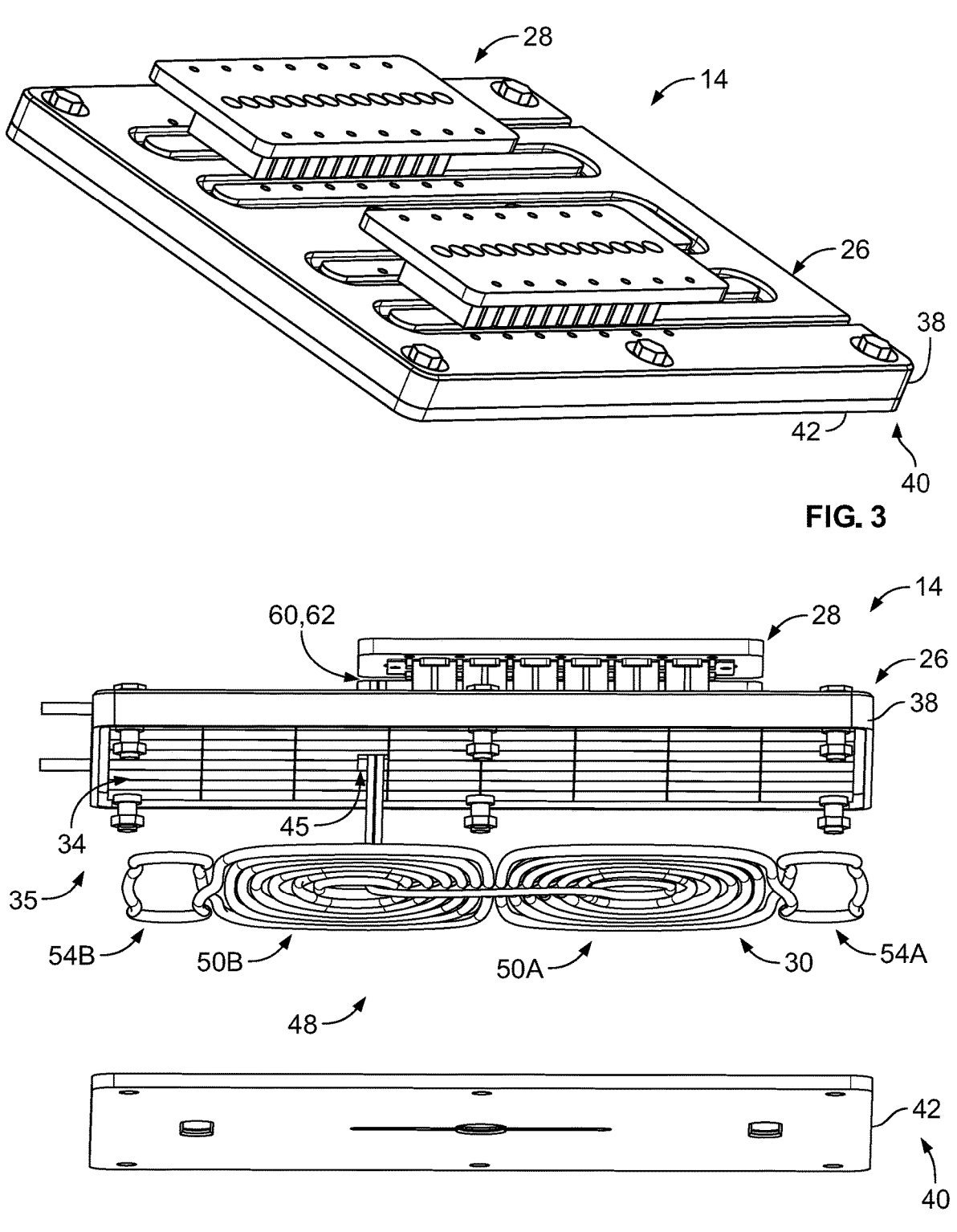
FIG. 3 is a perspective view of the wireless charge assembly of the vehicle of FIGS. 1 and 2.
FIG. 4 is a partially exploded perspective view of the wireless charge assembly of FIG. 3.

Referring now to FIG. 3, the illustrative wireless charge assembly 14 includes a shielding body 26 and a capacitor bank assembly 28. The capacitor bank assembly 28 is illustratively arranged in series with the WPT as suggested in FIG. 2. Referring to FIG. 4, the wireless charge assembly 14 includes a charge coil assembly 30 formed as the operational wireless power transfer coils. As discussed in additional detail herein, the charge coil assembly 30 is arranged to receive wireless power from a wireless power source such as the ground charging assembly 20, and to communicate electric power to the capacitor bank assembly 28 for charging the battery 16 of the transportation vehicle 12.

Figure 5:
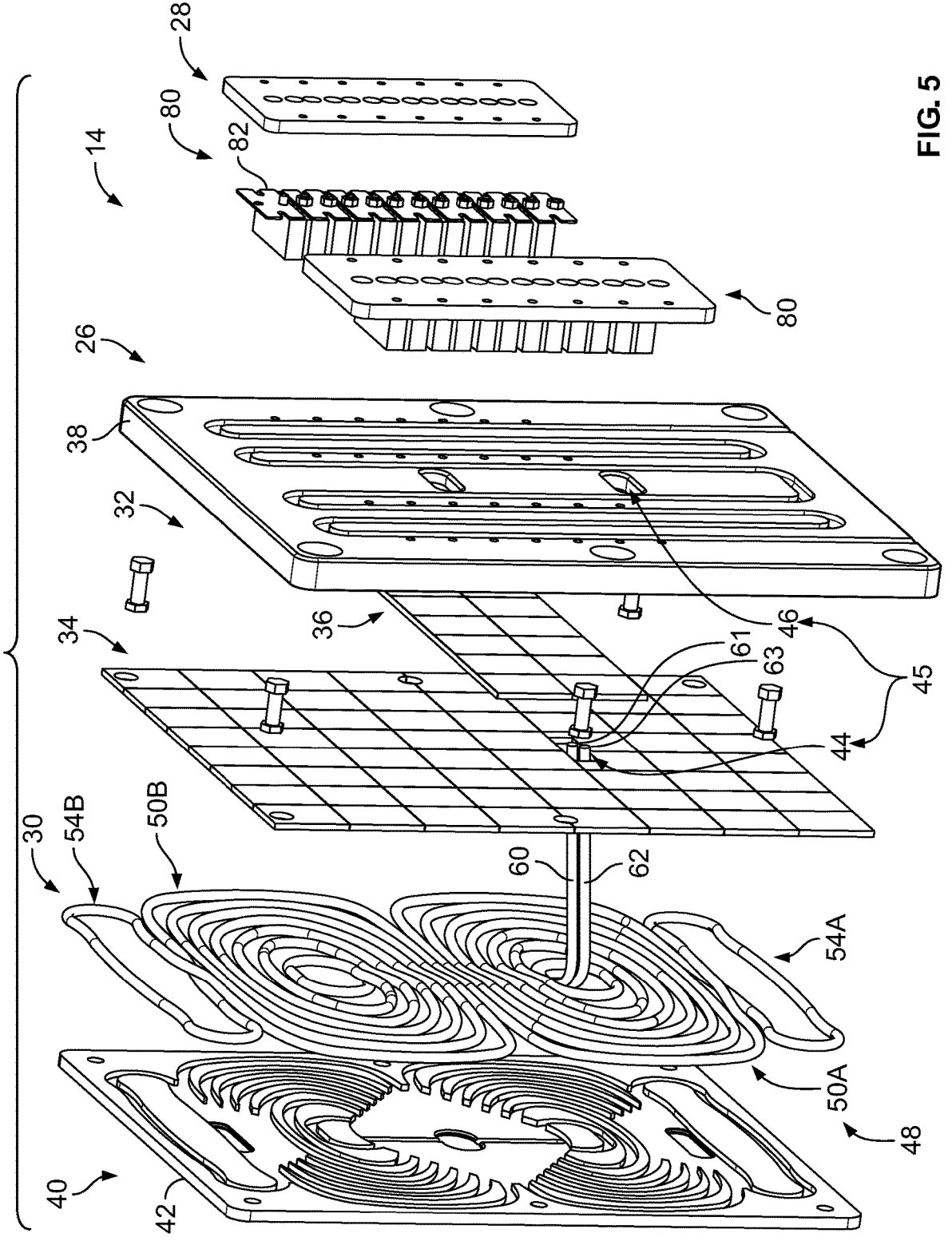
FIG. 5 is another exploded perspective view of the wireless charge assembly of FIGS. 3 and 4.

As shown in FIG. 5, the shielding body 26 includes a shield assembly 32. In illustrative embodiment, the shielding body 26 can provide enhancement and/or containment of the EM fields resultant from the charge coil assembly 30 and/or related fields. In the illustrative embodiment, the shield assembly 32 includes a shield sheet 34. The shield sheet 34 illustratively formed of ferrite tiles arranged collectively into a single sheet. The shield assembly 32 illustratively includes an additional shield sheet 36 arranged adjacent to the shield sheet 34, the additional shield sheet 36 likewise formed of formed of ferrite tiles arranged collectively into a single sheet parallel with the shield sheet 34, illustratively smaller than the shield sheet 34.

The shielding body 26 illustratively includes a covering 38. In the illustrative embodiment, covering 38 and a covering 42 collectively comprise a housing 40 defining an enclosure within which the shield assembly 32 and charge coil assembly 30 are arranged. The covering 38 illustratively receives the capacitor bank assembly 28 mounted therewith such that the housing and/or covering 38 define a heat sink.

The capacitor bank assembly 28 is arranged on one side (exterior side in the illustrative embodiment) of the shielding body 26, and the charge coil assembly 30 is arranged on an opposite side (interior side in the illustrative embodiment) of the shielding body 26 from the capacitor bank assembly 28. It can be appreciated that the charge coil assembly 30 can be arranged closer to the ground, generally parallel with the ground surface and thereby facing a ground charging assembly 20, such that the shielding body 26 generally separates the capacitor bank assembly 28 from the area of inductive wireless power transfer between the WPT coils of the assemblies 14, 20.

Referring still to FIG. 5, the shielding body 26 defines a conductor penetration 45 therethrough for passage of conductors for communication of power between the charge coil assembly 30 and the capacitor bank assembly 28. The conductor penetration 45 is illustratively defined by collective openings 44, 46 of the shield assembly 32 and covering 38, respectively. As discussed in additional detail herein managing the passage of conductors in a single penetration through the shielding body 26 and shield assembly 32 can assist in managing stray EM fields and/or decreasing the effects of unwanted additional fields.

In the illustrative embodiment, the opening 44 of the shield assembly 32 comprises an opening in the shield sheet 34, while the shield sheet 36 is formed such that it does not overlap the opening 44 permitting passage of conductors through each of the openings 44, 46 in a generally straight path with little or no change in routing. However, in some embodiments, the conductor penetration 45 may include an opening in shield sheet 36.

The charge coil assembly 30 is illustratively arranged between the covering 42 and the shielding body 26 within the enclosure of the housing 40. The charge coil assembly 30 is illustratively embedded within the covering 42, as indicated by impressions within the covering 42. The housing 40 thus illustratively encloses the charge coil assembly 30 and shield assembly 32 therein.

Figure 6:
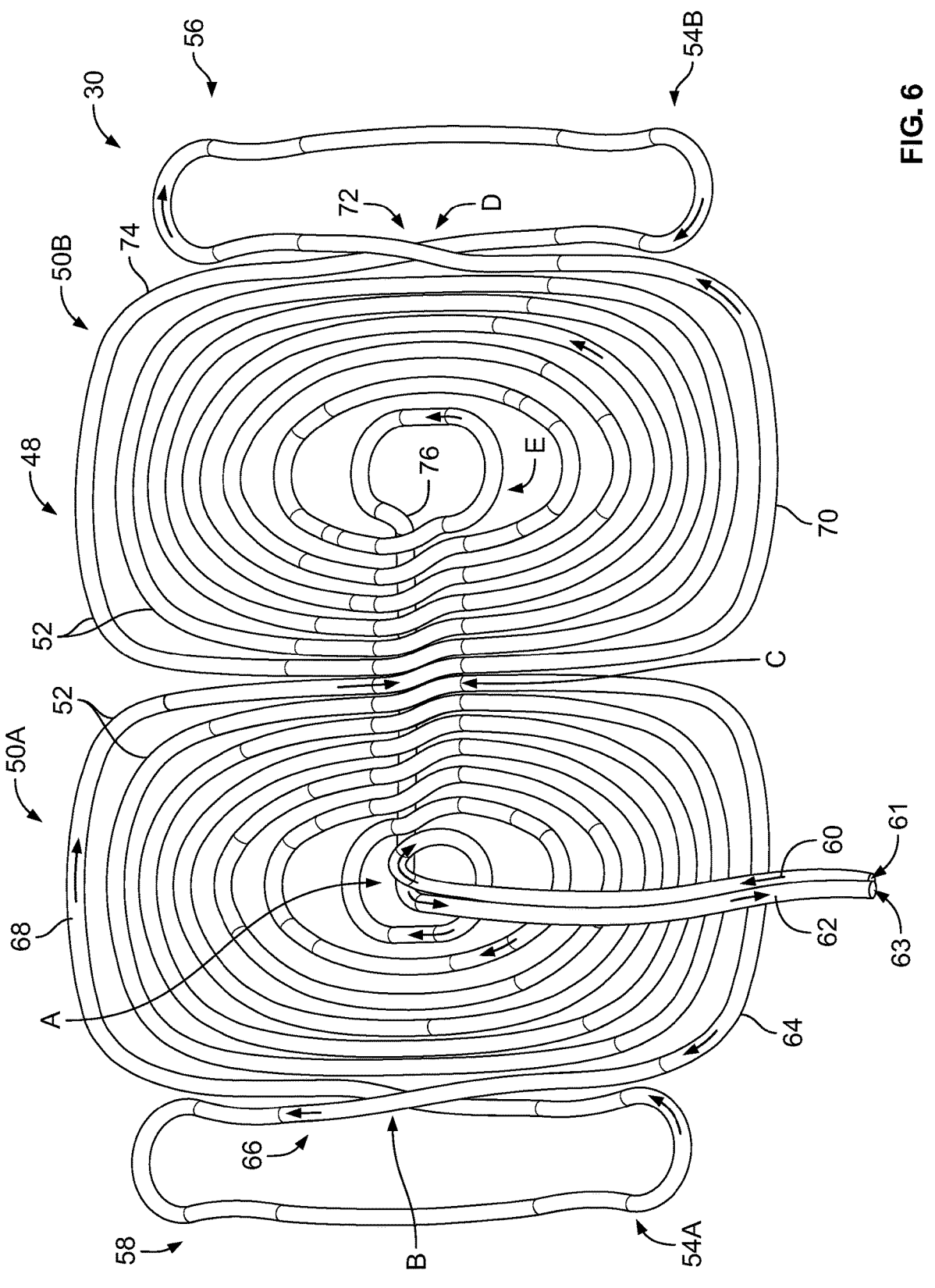
FIG. 6 is an overhead plan view of a coil assembly of the wireless charge assembly of FIGS. 3-5.

Referring now to FIG. 6, the charge coil assembly 30 is shown in isolation to illustrate its form. The charge coil assembly 30 includes coil body 48 illustratively including a pair of coils 50 (50A, 50B). Each coil 50A, 50B is defined by a number of coil turns 52.

The coil turns 52 corresponding with each coil 50A, 50B are generally arranged coplanar with each other within a charging plane defined thereby. The coil turns 52 are generally coaxial for their corresponding coil 50. In the illustrative embodiment, the coils 50A, 50B are each arranged generally flat, adjacent to each other within the same charging plane.

The coil body 48 illustratively includes shielding turns 54 (54A, 54B) for managing stray fields. The shielding turns 54 are illustratively arranged coplanar with the coils 50, within the charging plane. The shielding turns 54 are generally arranged flat with the coils 50, with the exception of the illustrative crossovers 66, 72 as discussed in additional detail herein. The shielding turns 54 are arranged on opposing ends 56, 58 of the coil body 48.

Referring still to FIG. 6, in the illustrative embodiment, the charge coil assembly 30 is formed of a continuous length of conductor. The conductor comprising two sections 60, 62 which extend to provide different terminals of the charge coil assembly 30 for communication of power with the capacitor bank assembly 28. The conductor, via the two sections 60, 62 receives wireless power transfer to conduct current as a circuit.

In FIG. 6, the charge coil assembly 30 is arranged in a top plan view. Arrows assist in illustrating the path of the conductor for ease of appreciation of its form. Terminal ends 61, 63 of the conductor are identified for ease of description. The conductor sections 60, 62 are shown extending radially with respect to a first coil 50A, however, with reference to FIG. 4, the sections 60, 62 near the terminal ends 61, 63 are illustratively embodied to extend orthongally to the charging plane in the assembled form.

Still referring to FIG. 6, the section 60 begins to define coil turns of the coil 50A near the center thereof at location A. The section 60 spirals clockwise in successive coils turns from the location A in the orientation of FIG. 6, illustratively defining seven coil turns. As the section 60 reaches the lower coil turn 64, it begins to define a crossover 66 at location B.

The crossover 66 defines a transition of the conductor to define the shielding turn 54A. Notably, at the crossover 66, in defining the shielding turn 54A, the section 60 begins to change its direction of turn to extend counterclockwise (when continuing along section 60 from the location A), opposite to that of coil 50A, before returning to the crossover 66 to define the upper coil turn 68.

The difference in direction of the coil 50A and shielding turn 54A allows current flowing through each of the coil 50A and shielding turn 54A to circulate in opposite directions (having different angular direction, counterclockwise versus clockwise) while passing through the conductor. This counterpoised circulation of current can provide EM field cancelation to manage stray fields from the wireless power transfer.

From the upper coil turn 68, the section 60 turns downward (in the orientation of FIG. 6) and begins to form a portion of conductor 62 at location C turning in the counterclockwise direction. Of course, definition between sections 60 and 62 is merely for descriptive purpose as the conductor is otherwise illustratively continuous, for example, to indicate the coils 50A, 50B. The lower coil turn 70 of coil 50B begins to define a crossover 72 at location D.

The crossover 72 defines a transition of the conductor to define the shielding turn 54B. Notably, at the crossover 72, in defining the shielding turn 54B, the section 62 begins to change its direction of turn to extend clockwise (when continuing along section 62 from the location C), opposite to that of coil 50B, before returning to the crossover 72 to define the upper coil turn 74.

The difference in direction of the coil 50B and shielding turn 54B from each other allows current flowing through each of the coil 50B and shielding turn 54B to circulate in opposite directions (having different angular direction, counterclockwise versus clockwise). This counterpoised circulation of current can provide EM field cancelation to manage stray field from wireless power transfer.

The upper coil turn 74 of coil 50B continues counterclockwise, also illustratively defining seven turns. Near location E, generally central to the coil 50B, the section 62 defines another crossover 76. The crossover 76 is generally formed as a straight routing of the conductor section 62 from near the center of coil 50B towards (near) the center of coil 50A near location A. In the illustrative embodiment, the crossover 76 crosses over (under in the orientation of FIG. 6) each turn of coils 50A and 50B. In some embodiments, coils 50A, 50B may have any suitable number of turns. In the illustrative embodiment, shielding turns 54A, 54B have single turns, but in some embodiments may have any suitable number of turns.

The coils 50A, 50B pass current in opposite directions from each other. The opposition direction of current can provide some EM field cancelation. Shielding turns 54A, 54B are illustratively defined on opposite sides of the coils 50A, 50B and can provide additional cancelation at different positions along the charging plane.

From near the center of coil 50A, both conductor sections 60,62 can now proceed out from the coil assembly for communication with the capacitor bank assembly 28. As the conductor sections 60, 62 must extend away from the charge coil assembly 30, their passage together having current flowing in opposite directions as a complete circuit can assist in reducing their stray fields beyond the shielding body 26.

Returning briefly to FIGS. 4 and 5, it can be appreciated that conductor penetration 45 accounts for the sections 60, 62 of conductor passing current in different directions towards and away from the charge coil assembly 30. Close proximity of the sections 60, 62 while extending from the coil body 48 can assist in reducing stray field by at least some cancelation. Additionally, as previously mentioned, passage through a single conductor penetration 45 in the shielding body 26 can reduce the risk of stray field passing the shielding body 26 and/or the effects unwanted additional fields via the shield assembly 32.

The sections 60, 62 extend through the shielding body 26 for communication with the capacitor bank assembly 28. As mentioned above, the capacitor bank assembly 28 is illustratively arranged in series with the coil assembly 30. Accordingly, one of the sections, e.g., section 60 may be connected with one portion (e.g., half) of the capacitor bank assembly 28, while the other section 62 may be in electrical communication with the other portion (e.g., other half) capacitor bank assembly 28. In some embodiments, the capacitor bank assembly 28 may be arranged in conjunction with other compensation components, such as inductors and/or other impedance control components, as a compensation network to provide power tuning. Accordingly, the capacitor bank assembly 28 provides input to the rectifier 22.

Returning briefly to FIG. 5, the capacitor bank assembly 28 illustratively includes two banks of capacitors 80. Each bank 80 includes a bus bar assembly 82 connecting each capacitor of the bank 80 in series. Each bank 80 includes a compression plate 84 which can provide alignment to the capacitors and sections of the bus bar assembly 82 by fitting into raised notches on one side of the compression plate 84 (as suggested in FIG. 4).

Nuts on top of the bus bar sections fit into holes in the corresponding compression plate 84 and can prevent creepage between the corners of the nuts. A layer of mylar tape on the bottom of the capacitors and between the nuts on top of the bus bar sections can provide additional insulation. The compression plates 84 are each illustratively secured with through-fasteners with the shielding body 26 to provide adequate clamping force for thermal contact with the covering 38. Cooling of the capacitor bank assembly 28 can be accomplished by thermal contact with the housing and/or covering 38.

Within the present disclosure, the coil assembly is formed as a Litz wire. The Litz wire may be embedded within the housing, for example, within a portion of the covering to increase stability and/or reduce spatial needs. Within the present disclosure, devices, systems, and methods for wireless power transfer may include battery management systems and/or related or intercommunicating control systems for conducting battery management and/or strictly battery charging activities. Such control systems may include processors, memory for storing instructions for execution by the processor, and communications circuitry for conducting related operations.

Within the present disclosure, devices, systems, and methods for wireless charging are disclosed. Details concerning the wireless charge vehicle assembly 14 can apply equally to the ground assembly 20; for example, the coil arrangements such as the routing of the conductor sections 60, 62 of the coil body 48, including shielding turns 54, can apply equally to the WPT coil of the ground assembly 20; moreover, the shielding, conductor penetration, and other arrangements of wireless charge vehicle assembly 14 can apply equally to the ground assembly 20. In some embodiments, the wireless charge vehicle assembly 14 and the ground assembly 20 may share similarities in arrangements or may have wholly distinct arrangements from each other.

Examples of suitable processors may include microprocessors. Examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry may include components for facilitating processor operations, for example, suitable components may include transmitters, receivers, modulators, demodulators, filters, modems, analog/digital (AD or DA) converters, diodes, switches, operational amplifiers, and/or integrated circuits.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A vehicle capable of wireless charging comprising:
a transportation vehicle chassis having a lower section; and
a charge assembly mounted with the lower section and configured to receive wireless charge from a ground charge assembly, the charge assembly comprising a shielding body, a capacitor bank assembly arranged on one side of the shielding body, and a charge coil assembly arranged on an opposite side of the shielding body, the charge coil assembly comprising a coil body including a number of coils each having coil turns arranged in a charging plane, wherein the coil body includes a plurality of shielding turns positioned along the charging plane adjacent the number of coil turns, wherein the shielding turns are arranged on opposing ends of the coil body within the charging plane,
wherein ends of the number of coils penetrate through the shielding body at the same location to reduce additional flux and/or stray field, wherein the location of penetration through the shielding body corresponds with a center of one of the coils.

2. The transportation vehicle of claim 1, wherein each shielding turn is arranged to circulate current in a shielding direction defined opposite to a charging direction in which current circulates via corresponding adjacent coil turns.

3. The transportation vehicle of claim 2, wherein one shielding turn is arranged to circulate current in its shielding direction defined as either one of clockwise or counterclockwise, and the corresponding adjacent coil turns are arranged to circulate current in their charging direction defined as the other of clockwise and counterclockwise.

4. The transportation vehicle of claim 3, wherein another shielding turn is arranged to circulate current in its shielding direction defined as the other of clockwise or counterclockwise, and the other corresponding adjacent coil turns are arranged to circulate current in its charging direction defined as the one of clockwise and counterclockwise.

5. The transportation vehicle of claim 1, wherein the charge coil assembly is formed as a continuous length of conductor.

6. The transportation vehicle of claim 1, wherein the number of coils includes at least two coils arranged side by side, and the continuous length of conductor crosses the coils turns of each of the at least two coils on the adjacent sides.

7. The transportation vehicle of claim 1, wherein the charging plane is parallel with the ground.

8. The transportation vehicle of claim 1, wherein the charge coil assembly is configured to reduce stray field in a bipolar single-phase arrangement for inductive wireless charging.

9. The vehicle of claim 1, wherein the location of the penetration corresponds with the center of the one of the coils as a radial center.

10. A vehicle wireless charge assembly comprising:
a shielding body;
a charge coil assembly arranged on one side of the shielding body; and
a charge coil assembly arranged on an opposite side of the shielding body, the charge coil assembly comprising a coil body including a number of coils each having coil turns arranged in a charging plane, wherein the coil body includes a plurality of shielding turns positioned along the charging plane adjacent the number of coil turns, wherein the shielding turns are arranged on opposing ends of the coil body within the charging plane,
wherein ends of the number of coils penetrate through the shielding body at the same location to reduce additional flux and/or stray field, wherein the location of penetration through the shielding body corresponds with a center of one of the coils.

11. The assembly of claim 10, wherein each shielding turn is arranged to circulate current in a shielding direction defined opposite to a charging direction in which current circulates via corresponding adjacent coil turns.

12. The assembly of claim 11, wherein one shielding turn is arranged to circulate current in its shielding direction defined as either one of clockwise or counterclockwise, and the corresponding adjacent coil turns are arranged to circulate current in their charging direction defined as the other of clockwise and counterclockwise.

13. The assembly of claim 12, wherein another shielding turn is arranged to circulate current in its shielding direction defined as the other of clockwise or counterclockwise, and the other corresponding adjacent coil turns are arranged to circulate current in its charging direction defined as the one of clockwise and counterclockwise.

14. The assembly of claim 11, wherein each shielding turn is formed of a continuous length of conductor integral with the corresponding adjacent coil turns.

15. The assembly of claim 10, wherein the number of coils includes at least two coils arranged side by side, and the continuous length of conductor crosses the coils turns of each of the at least two coils on the adjacent sides.

16. The assembly of claim 10, wherein the charge coil assembly is configured to reduce stray field in a bipolar single-phase arrangement for transportation vehicle wireless charging.

17. The assembly of claim 10, wherein the charge coil assembly is formed as a continuous length of conductor.

18. The assembly of claim 10, wherein the location of the penetration corresponds with the center of the one of the coils as a radial center.

*   *   *   *   *